(12) United States Patent   (10) Patent No.: US 12,592,166 B2
Vermeersch   (45) Date of Patent: Mar. 31, 2026

(54) DEVICE FOR THE CREATION AND MANAGEMENT OF STYLE PROTOTYPES WITH THE INTEGRATION OF PHYSICAL AND VIRTUAL TOOLS

(71) Applicant: GRANSTUDIO S.P.A., Turin (IT)

(72) Inventor: Lowie Vermeersch, Turin (IT)

(73) Assignee: GRANSTUDIO S.P.A., Turin (IT)

( * ) Notice: Subject to any disclaimer, the term of this patent is extended or adjusted under 35 U.S.C. 154(b) by 448 days.

(21) Appl. No.: 18/247,320

(22) PCT Filed: Sep. 28, 2021

(86) PCT No.: PCT/IB2021/058845
§ 371 (c)(1),
(2) Date: Mar. 30, 2023

(87) PCT Pub. No.: WO2022/070033
PCT Pub. Date: Apr. 7, 2022

(65) Prior Publication Data
US 2024/0005819 A1    Jan. 4, 2024

(30) Foreign Application Priority Data

Sep. 30, 2020    (IT) ........................ 102020000023053

(51) Int. Cl.
*G09B 25/00*    (2006.01)
*G02B 27/01*    (2006.01)
*G09B 9/05*    (2006.01)
(52) U.S. Cl.
CPC ........... *G09B 25/00* (2013.01); *G02B 27/017* (2013.01); *G09B 9/05* (2013.01)

(58) Field of Classification Search
CPC ......... G09B 25/00; G09B 9/05; G02B 27/017
USPC .......................................................... 434/39
See application file for complete search history.

(56) References Cited

U.S. PATENT DOCUMENTS 6,371,766 B1 * 4/2002 Doll ...................... G09B 9/042
434/62
2019/0371196 A1 * 12/2019 Pittman ................... G09B 9/05

FOREIGN PATENT DOCUMENTS

KR    20170084855 A    7/2017

OTHER PUBLICATIONS

International Search Report and Written Opinion of International Application No. PCT/IB2021/058845, mailed on Jan. 26, 2022, 8 pages.

* cited by examiner

*Primary Examiner* — Pierre E Elisca
(74) *Attorney, Agent, or Firm* — Heslin Rothenberg Farley and Mesiti P.C.; Victor A. Cardona, Esq.

(57) ABSTRACT

Device for the creation and management of style prototypes comprising a plurality of physical supports and a digital medium comprising a CPU and a display and control device. The physical supports are movable and adjustable by means of a plurality of respective actuators. The CPU is configured to actuate the actuators to adjust the positioning of the physical supports to predetermined positions, or to display the position of the physical supports.

9 Claims, 5 Drawing Sheets

DEVICE FOR THE CREATION AND MANAGEMENT OF STYLE PROTOTYPES WITH THE INTEGRATION OF PHYSICAL AND VIRTUAL TOOLS

CROSS REFERENCE TO RELATED APPLICATIONS

This application is a national stage filing under Section 371 of International Application No. PCT/IB2021/058845, filed Sep. 28, 2021, published in English on Apr. 7, 2022, as WO 2022/070033 and which claims priority from Italian Patent Application No. 102020000023053 filed on Sep. 30, 2020, the entire disclosures of which are incorporated herein by reference.

FIELD OF THE INVENTION

The present invention relates to a device for the design, review and presentation of design and/or prototype solutions for vehicles (exterior and interior), and more particularly it relates to such a device allowing a seamless connection between a physical support (at least one floor, a pair of seats, a front head including a steering wheel) and a digital medium.

STATE OF THE PRIOR ART

Since the design of the exterior and interior of passenger cars has become a fundamental aspect for their sales success, definition, creation, refinement and presentation of body shapes and interior ergonomics have become major challenges for designers who face new technical and stylistic problems with tools, especially for the improvement and presentation of models, which are not adequate from an economic and environmental point of view.

Currently, for example, during the design process of a new car, it is customary to create physical models in full scale both to refine the shape of the surfaces and to present the models to technicians and customers.

To date, the use of computers has allowed to digitise most of the design processes to offer the designer a faster and more direct control over the definition and creation of the sought shapes. However, there is currently no device that allows the designer to refine and present the project thereof by integrating physical and virtual tools in order to reduce the time, costs and waste typical of the creation of traditional mockup models (3D printing, wooden and clay models clay, etc.).

SUMMARY OF THE INVENTION

The object of the present invention is to overcome the aforementioned drawback. In order to achieve this object, the invention relates to a device for integrating the physical and virtual environment for the preparation, evaluation and presentation of style prototypes of the type defined in the preamble of claim 1 comprising physical supports, a CPU and a display and control device comprising at least one 3D virtual or augmented reality display (44) that can be worn by a user, wherein the position of the physical supports is correlated with the position of the digital medium being movable and adjustable by means of a plurality of respective actuators, and wherein the CPU is configured to carry out at least one of the following actions: actuate one or more of the actuators so as to adjust the positioning of the physical supports to predetermined positions, the predetermined positions being set by means of the display and control device, and/or displaying, by means of the display and control device, a position of the physical supports, the position being set by actuating the actuators.

Thanks to this solution idea, a single device according to the invention can be used for the refinement and presentation of different projects, reducing the production of physical mockup supports normally required and entailing advantages in terms of costs, times, storage space and transportation of the models. A further advantage of the invention lies in providing a device that allows to reduce the times and the costs of the design process. Such combination of physical supports and virtual models allows designers to replace physical models with an almost fully digital design, review, and presentation model.

Furthermore, thanks to the 3D virtual or augmented reality visor, the colours, shapes, ergonomics of the components, etc. can be viewed, verified, presented and possibly modified in real time while guaranteeing to the user a full integration between visual and tactile sensations.

In an embodiment, the display and control device may comprise a tablet, a computer, a flat screen or the like, connected directly or remotely to the CPU, which—besides being capable of managing the movement of physical objects—also represents a layout of movements that reproduce entire ergonomic sequences. This allows to share, for example, a presentation of a new car model with a plurality of users, even remotely.

In an embodiment of the invention, the plurality of movable physical supports may comprise one or more of the following supports, which can be directly interfaced with the virtual reality reproduced on the display device: at least one automotive pedal arranged under the steering wheel, at least one armrest arranged laterally at one of the seats, which can integrate possible pressure sensors suitable to provide ergonomic feedback to and from the virtual reality, at least one switch and/or at least one screen arranged on the front head.

In a preferred embodiment of the invention, the front and rear heads and the floor comprise portions carrying at least one from among: quadrangular sections provided with grooves, threaded holes and/or neodymium magnets for coupling additional functional, visual and mockup elements to be installed on the device. As a matter fact, the device according to the invention is designed as an 'open' platform, i.e. a base on which there can be added various types of physical supports, such as CNC-milled foam components, additional supports and screens, etc., to simulate the design shapes and ergonomics as much as possible.

According to a further aspect of the invention, the device for the creation and management of style prototypes comprises at least one manual switch for actuating at least one of the actuators.

According to a further aspect of the invention, the device is capable of simulating a plurality of configurations of the seat different from the nominal design configuration of the seat, by means of one or more further adjustment devices and/or at least one manual switch.

Furthermore, the device according to the invention conveniently consists of a movable unit.

The invention also relates to a digital medium which can be interfaced to the 3D virtual or augmented reality visor, and it is designed to connect sensory sensations and feedback to movements and/or adjustments of a plurality of physical supports, preferably including a floor, at least one seat and a front head including a steering wheel. The digital medium comprises a CPU and a display and control device (44,45,46), and the CPU is configured to actuate one or more actuators so as to adjust the positioning of the physical supports to predetermined positions, wherein the predetermined positions are set by the display and control device; to display, by means of the display and control device, a position of the physical supports, wherein the position is set by actuating the actuators. The predetermined positions are reproductions of all said components and actuators of new or existing vehicles, so as to reproduce the habitability, accessibility and reachability of all the physical supports.

Therefore, the present invention provides a device for the creation and management of style prototypes which allows a user to:

review and present designs for car interiors and exteriors during the design process both on site and remotely, develop and verify the ergonomics related to the design, for armrest height, positioning of instruments and cockpit screens etc.

present different car models using a single device for presentations to customers even remotely, sharing the same experience with participants, reducing the amount of travel required for design managers and eliminating the time and cost of shipping physical models around the world.

Furthermore, the present invention provides for the use of a 3D virtual or augmented reality visor that can be worn by a user, wherein the screen is connected to a CPU, wherein the CPU is configured to carry out at least one of the following actions: actuate one or more actuators so as to adjust the positioning of the physical supports to predetermined positions, wherein the predetermined positions are set by means of the display and control device; to display, by means of the display and control device, a position of the physical supports, the position being set by actuating the actuators, wherein the predetermined positions are reproductions, by means of routine movements of all the components and actuators, of new or existing vehicles, for example reproducing the habitability, accessibility and reachability of the physical supports.

The object of the invention is to create a correlation between the physical world and the digital world in order to increase the originality and communication ability thereof compared to a presentation following a "Conventional workflow".

Furthermore, the object of the invention is to validate the design in the earliest stages of the process and make it faster and more cost-effective; it is a design tool that makes the development of the design more efficient and effective. From the start to the end, the design process goes through many steps and at the end of each step the result is a list of "specifications": the invention allows to make these specifications implementable and displayable, and therefore reduces the risk of errors or misinterpretations through continuous validation: this allows to define a new workflow that can be defined as the "phygital prototyping process".

The invention therefore creates a dynamic real-time correlation between physical and digital that allows an early validation of the design, which results in a saving time and money making the conventional vehicle design process simpler and more flexible.

Furthermore, the invention allows a user testing step at the beginning of the project, and not at the end (as is normally the case): for example, users can test and validate ergonomics using the device for integrating the physical and virtual environment according to the invention, so as to be able to define the most suitable layout for each different project in advance.

This solution idea allows to combine digital technology with the surrounding physical environment, for example allowing virtual design, to prepare an animation of a specific design, and then the device according to the invention allows to reproduce it physically: this new process allows to simulate the virtual design of a vehicle by mapping it in a physical environment.

Furthermore, the device according to the invention allows to add only the components/restrictions deemed relevant for the validation of the design, making the entirety more cost-effective and simpler.

Furthermore, the device according to the invention allows to physically view and test what a user is viewing in virtual reality, transmitting the contents on a standard screen or tablet and keeping them synchronised in both directions. Therefore, viewers can have feedback on what is happening in virtual reality, adding value to the presentations, in which only a limited number of users would normally use VR technology.

Furthermore, besides the visual effects, the solution idea according to the invention allows to provide for tactile feedback.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

Figure 1:
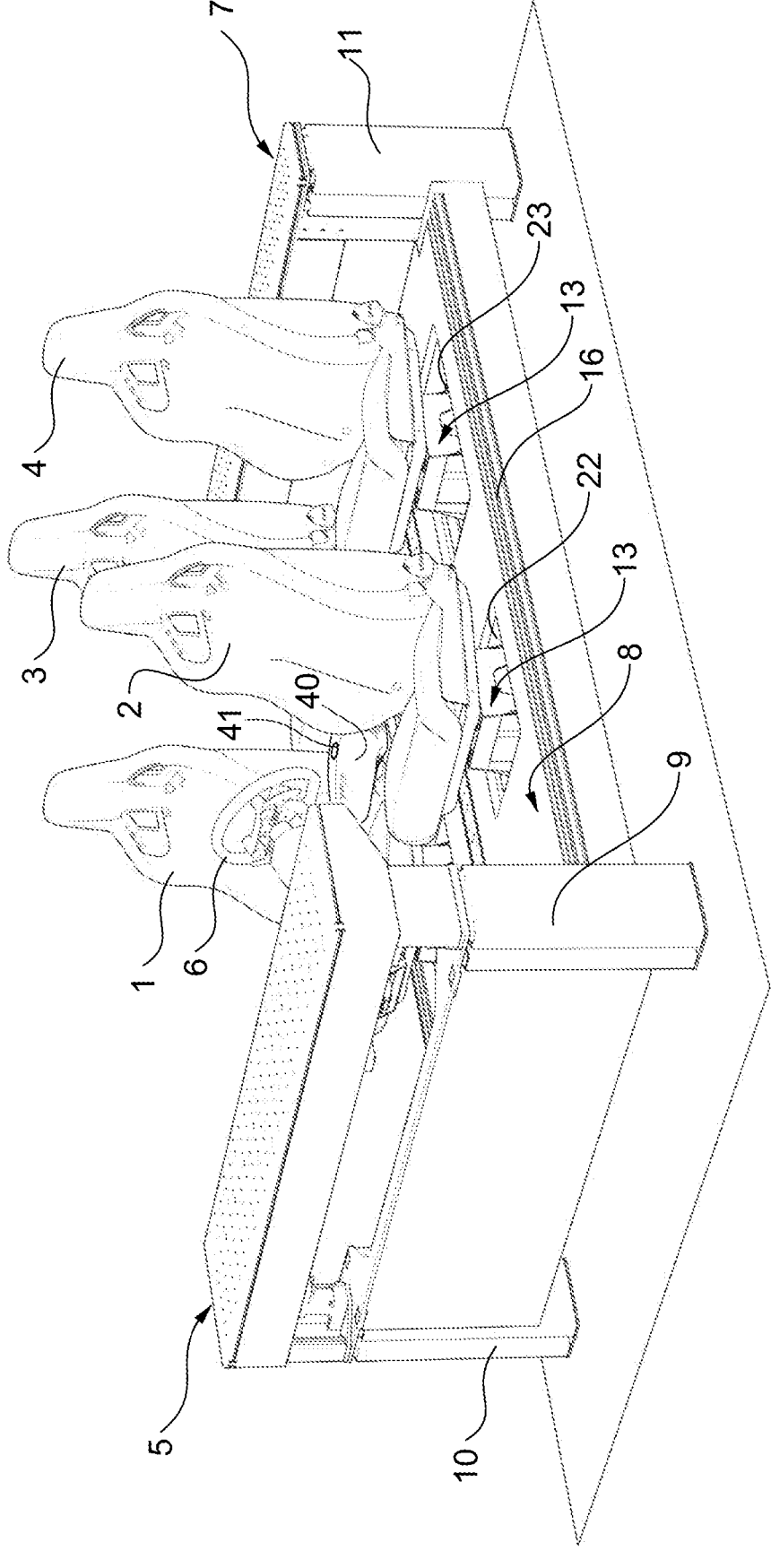
FIG. 1 is a front schematic perspective view if a first embodiment of the device for the creation and management of style prototypes according to the invention.

Initially with reference to FIG. 1, the device for integrating the physical and virtual environment for the creation and management of style prototypes according to the invention is illustrated in an embodiment comprising a floor 8 that can be moved vertically by means of two pairs of actuators 9,10,11,12 arranged in proximity to the end angles thereof. The floor 8 is provided with a pair of front rectangular openings 22 and a pair of rear rectangular openings 23 for the installation of a pair of front seats 1,2 and a pair of rear seats 3,4, respectively. Each seat 1 is provided with a respective electric movement and adjustment device 13, which will be described hereinafter. The device according to the invention further comprises a front head 5 which includes a steering wheel 6—also movable and adjustable— and a rear head 7 which includes a part of a digital medium which will be described hereinafter.

Figure 2:
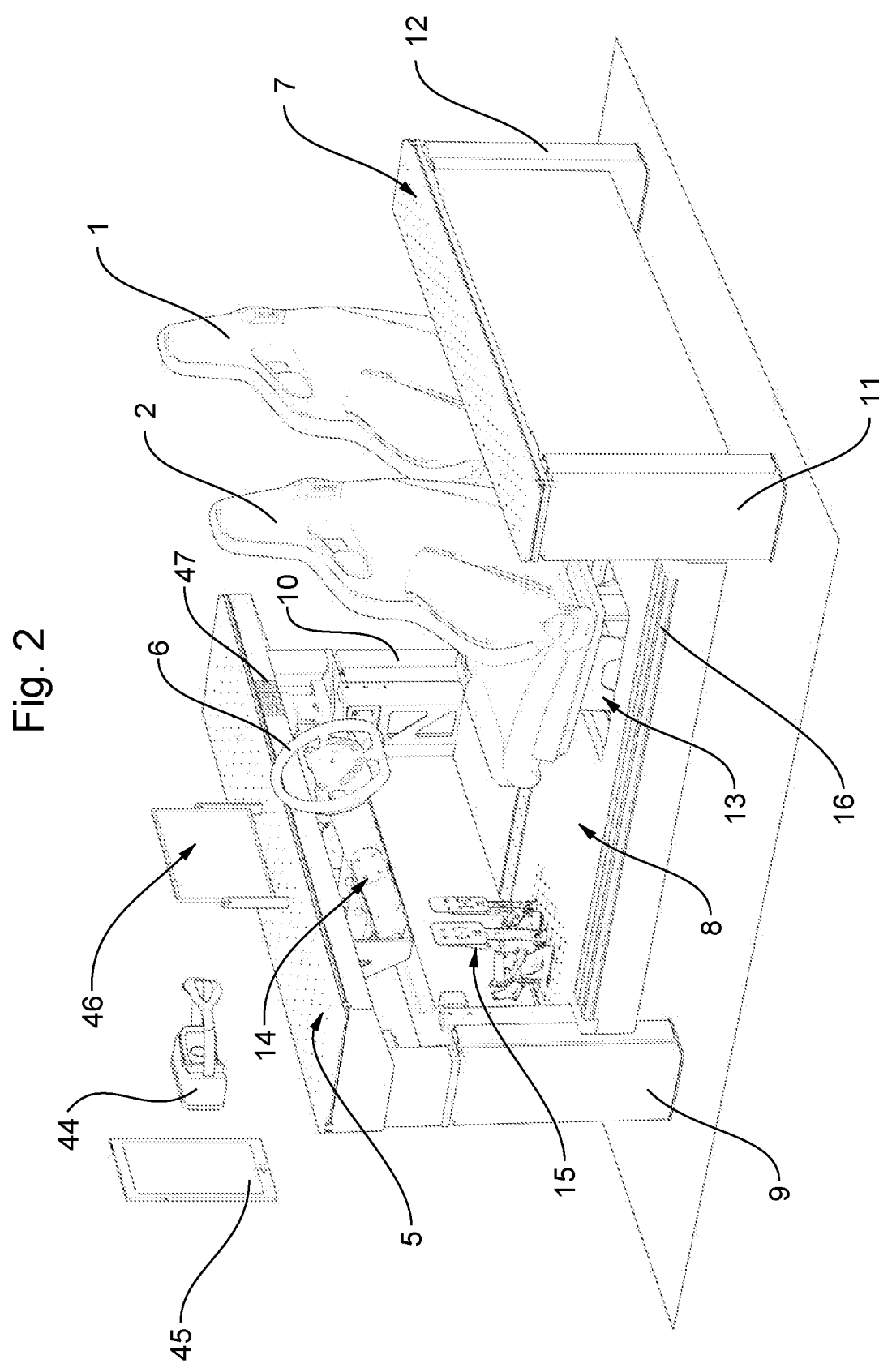
FIG. 2 is a rear schematic perspective view of a second embodiment of the device according to the invention.

FIG. 2 shows an alternative embodiment of the invention, in which parts identical or similar to those already described above are indicated using the same reference numerals, comprising only a pair of seats 1,2. Furthermore, FIG. 2 shows a pair of automotive pedals 15, an electrical device 14 for moving and adjusting the steering wheel 6, a screen 46 arranged on the front head 5, a 3D virtual or augmented reality visor 44 and a tablet 45 which will be described hereinafter.

Figure 3:
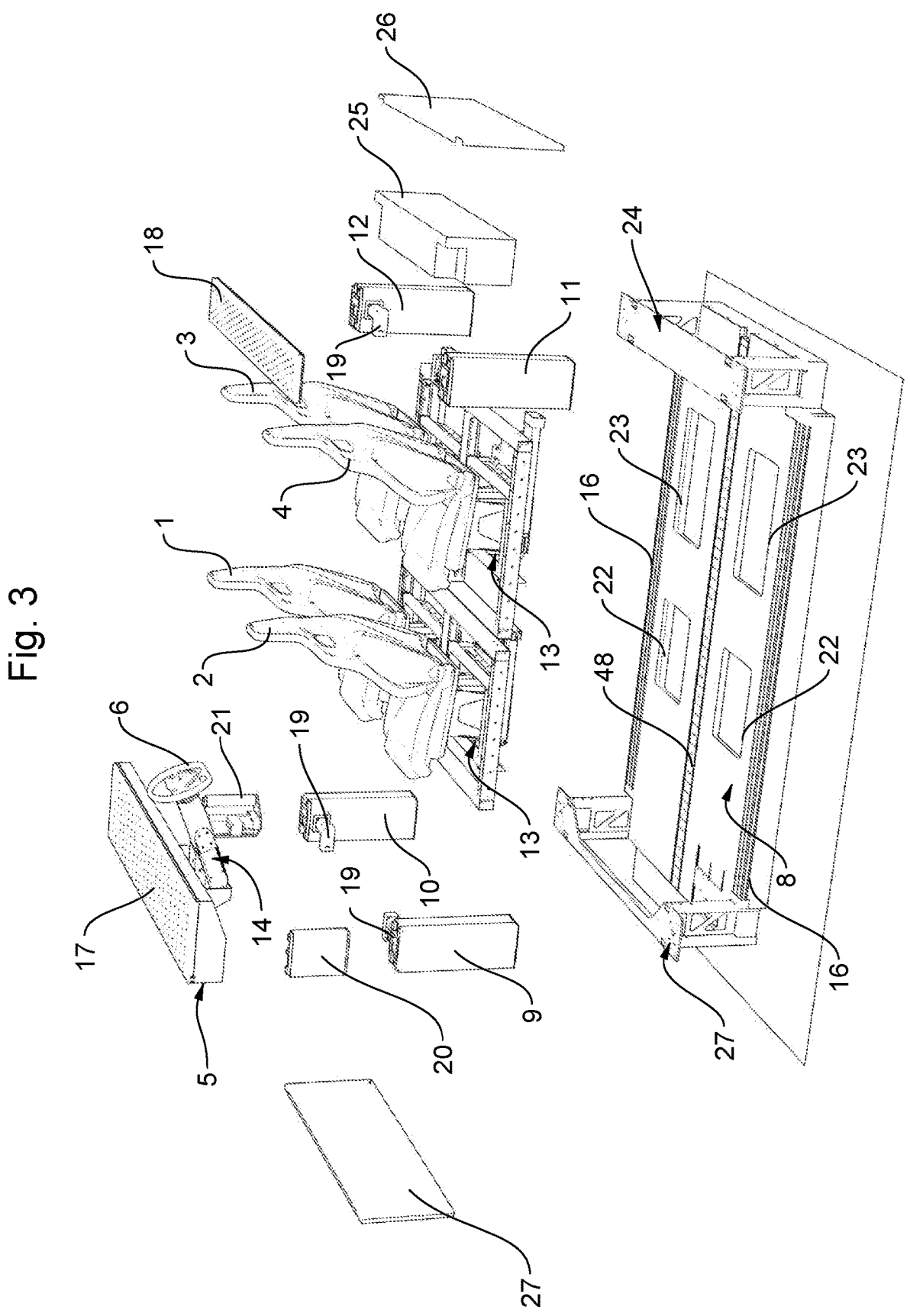
FIG. 3 is a partly exploded view of FIG. 1.

Now, with reference to FIG. 3, the floor 8 includes, on the upper face thereof, a pair of lateral portions 16 provided with quadrangular sections carrying grooves, and a median portion 48 provided with threaded holes and/or neodymium magnets for coupling additional functional elements and mockups such as doors, one or more armrests 40 provided with pressure sensors 41, suitable to provide ergonomic feedback to and from the virtual reality, etc. already installed or to be installed on the device according to the invention whenever required. Furthermore, the front 5 and rear 7 heads also comprise respective upper panels 17,18 also provided with threaded holes and/or neodymium magnets for the coupling of additional functional and visual elements such as, for example, a flat screen 46 shown in FIG. 2. The front/rear head 5,7 further comprises a fixed frame 24 for supporting the upper panel 17,18 and a front/rear cover net 27.

Still with reference to FIG. 3, each of the actuators 9,10,11,12 of the floor 8 comprises a respective movable bracket 19 connected to an end portion of the floor 8 so as to be able lift and lower it with respect to the other physical supports of the device according to the invention. Furthermore, each of the front actuators 9,10 is provided with a respective axially movable column 20,21 connected—at the top part—to a lateral portion of the front head 5 for the adjustment and movement thereof. The rear head 7 comprises a frame 24, part of the digital medium which includes a CPU 25 and a cover panel 26.

Figures 4, 5, 6:
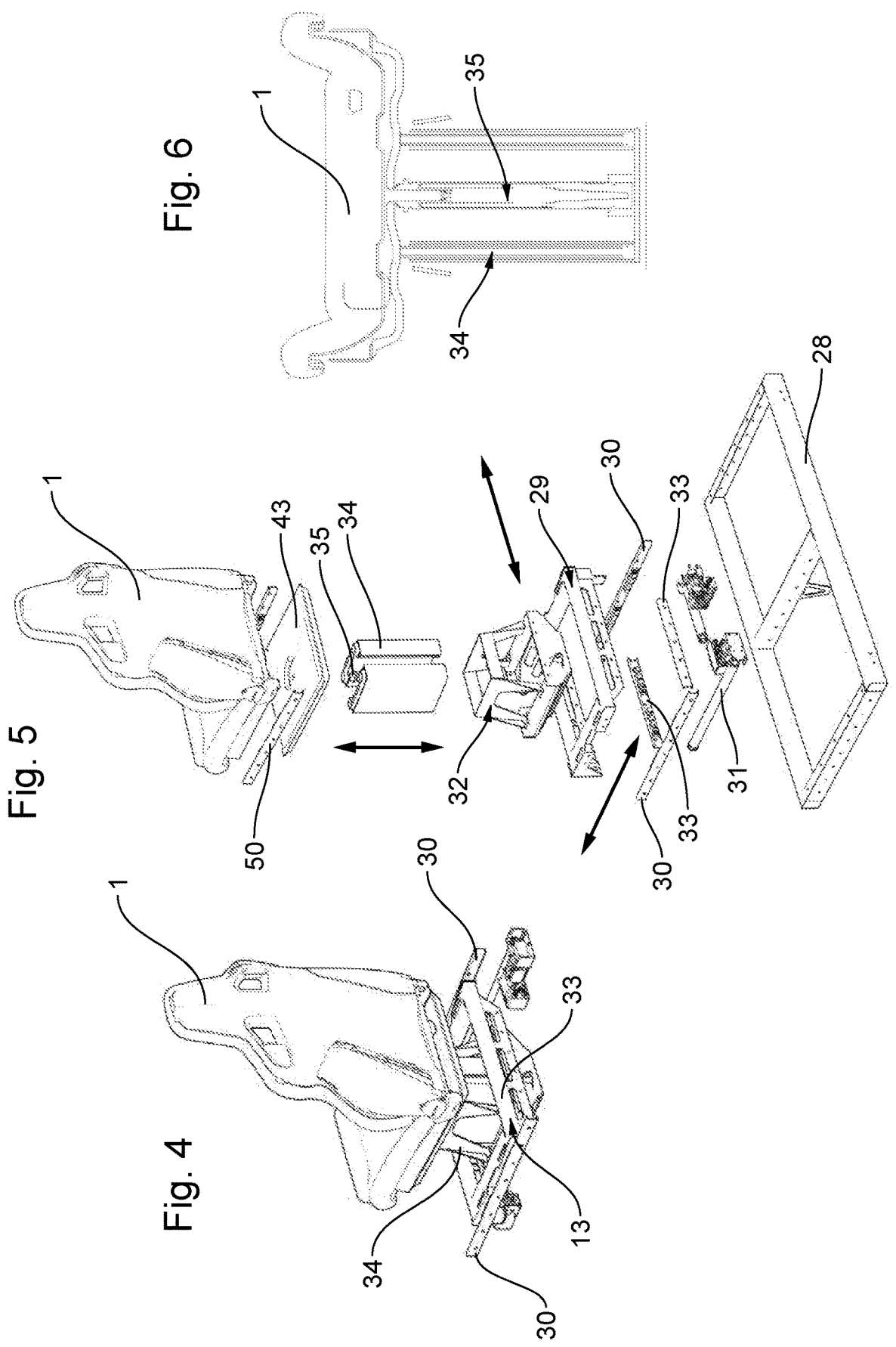
FIG. 4 is a schematic perspective view of a detail of FIG. 1.
FIG. 5 is an exploded view of FIG. 4.
FIG. 6 is a vertical sectional view and in enlarged scale of a part of FIG. 4.

FIGS. 4,5,6 show the electric device 13 for moving and adjusting each of the seats 1,2,3,4 which can be moved and adjusted along the three axes X, Y, Z. The movement and adjustment device 13 comprises a support frame 28 on which a slide 29 is movable along longitudinal sliding guides 30 actuated by an actuator 31, and a support 32 movable transversely with respect to the slide 29 along guides 33. Inside the support 32 there is arranged a hollow element 34 inside which a cylindrical actuator 35 which can be actuated vertically along the direction of the arrow, connected to the respective seat 1 by means of a plate 43.

Figure 7:
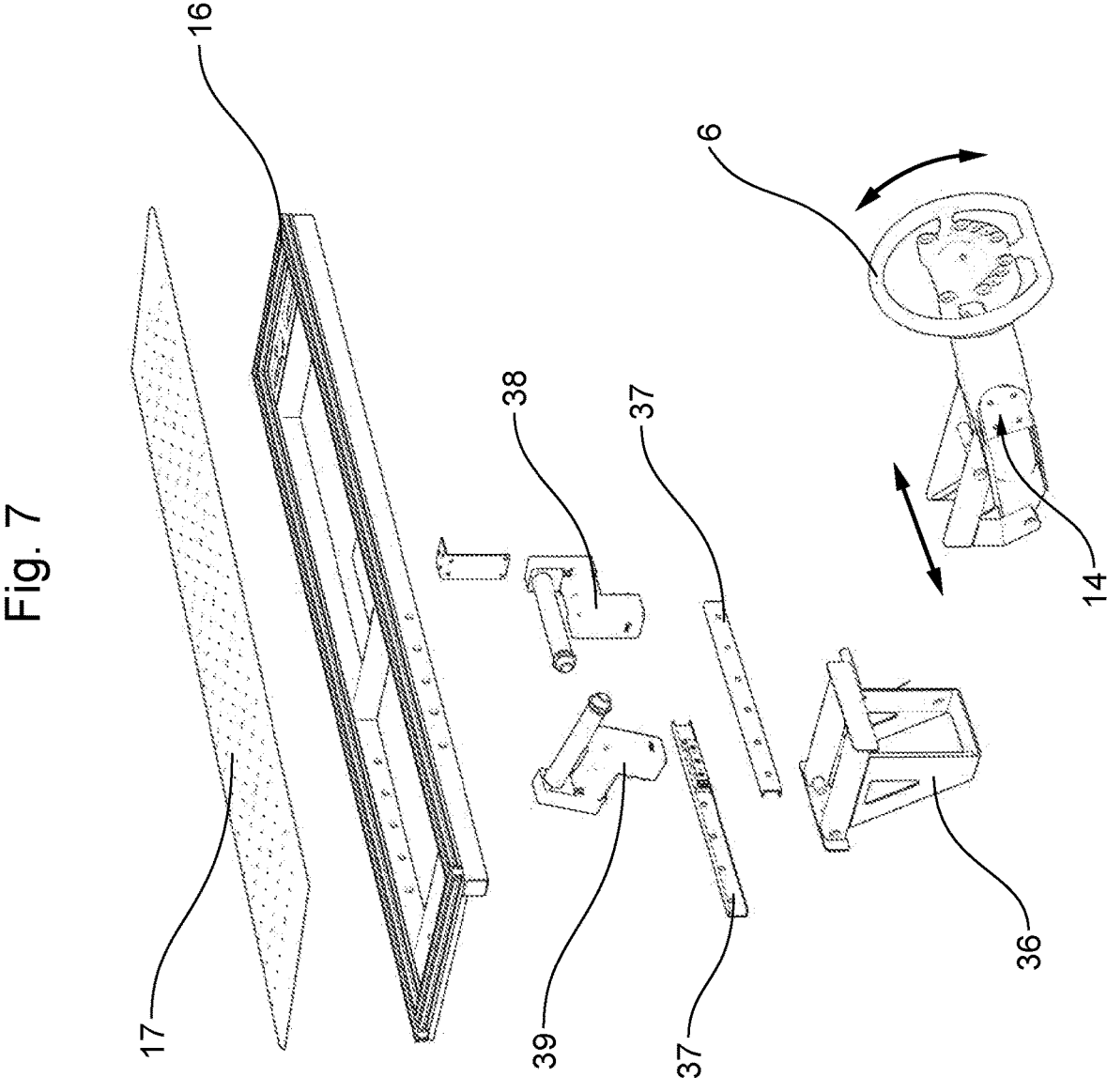
FIG. 7 is an exploded view of another detail of FIG. 1.

FIG. 7 shows a portion 16 of the front head 5 carrying the coupling grooves, a support 36 movable along transverse guides by means of an actuator 38 for the lateral adjustment of the steering wheel 6, and a device for the vertical adjustment of the steering wheel 6 comprising a pair of guides 37, a bracket 14 articulated to a fixed support 36 and rotatable by means of an actuator 39.

The device according to the invention can be used in at least two different operating modes.

In the first, for example for a presentation of a new car model, a designer may position each of the aforementioned mobile supports in relation to the technical, ergonomic and legislative layout of the vehicle using a computer or tablet 45. Therefore, a potential customer can simultaneously view the visual aspect of the design using, for example, the 3D virtual or augmented reality visor 44 or the screen 46, as well as test the ergonomics and actual functionality of the basic controls and commands of a modern car using the physical supports positioned correspondingly.

In a second operating mode, the device according to the invention can allow a designer to view a predetermined configuration of the physical elements of a motor vehicle being designed, for example using the 3D virtual or augmented reality visor 44 or the screen 46 and simultaneously test the ergonomics and style thereof so that, if necessary, the user can be modified them in real time using, for example, the computer or tablet 45.

Obviously, the construction details and the embodiments may widely vary with respect to what has been described and illustrated, without departing from the scope of protection of the present invention as defined in the claims that follow. Thus, for example, the general configuration of the seats, the steering wheel 6 and the pedals could be different from the one shown in the drawings, and be adapted to models of car models all over the world.

The invention claimed is:

1. Device for integrating the physical and virtual environment, comprising:
   a plurality of physical supports, movable and/or adjustable by means of a plurality of respective actuators, preferably including a floor, at least one seat and a front head which includes a steering wheel, and
   a digital medium comprising a CPU and a display and control device
   and wherein said CPU is configured to carry out the following action:
   actuate one or more of said actuators so as to adjust the positioning of said physical supports in predetermined positions, said predetermined positions being set by means of said display and control device, wherein said display and control device comprises at least one 3D virtual or augmented reality visor wearable by a user and said CPU is configured to display, through said display and control device, a position of said physical supports, the position being set by actuating said actuators wherein said predetermined positions are reproductions of all the components and actuators reproducing the habitability, accessibility and reachability of said physical supports.

2. Device according to claim 1, wherein said display and control device comprises a tablet, a computer, or a flat screen, connected directly or remotely to said CPU, which—besides being capable of managing the movement of physical objects—also represents a layout of movements that reproduce entire ergonomic sequences.

3. Device according to claim 1, wherein said plurality of movable physical supports comprises one or more of said supports directly interfaced with the virtual reality reproduced on the display device:
   at least one automotive pedal arranged under the steering wheel,
   at least one armrest arranged laterally at one of said seats which can integrate possible pressure sensors suitable to provide ergonomic feedback to and from the virtual reality,
   at least one switch and/or at least one screen arranged on said head.

4. Device according to claim 1, further comprising a rear head,
   said floor, said front head and said rear head comprising portions carrying at least one from among:
   quadrangular sections provided with grooves,
   threaded holes,
   neodymium magnets,
   for the coupling of additional functional, visual and mockup elements to be installed on said device.

5. Device according to claim 1, further comprising at least one manual switch for actuating at least one of said actuators.

6. Device according to claim 5, wherein said device is capable of simulating a plurality of configurations of the seat, different from the nominal design configuration of the seat, by means of one or more further adjustment devices.

7. Digital medium configured be interfaced with a 3D virtual or augmented reality visor, and designed to connect sensory sensations and feedback to movements and/or adjustments of a plurality of physical supports, including a plurality of physical supports, preferably including a floor, at least one seat and a front head including a steering wheel, said digital medium comprising a CPU and a display and control device, wherein said CPU is configured to carry out the following action:

actuate one or more actuators so as to adjust the positioning of the physical supports in predetermined positions, said predetermined positions being set by means of said display and control device, display, through said display and control device, a position of said physical supports, the position being set by actuating said actuators wherein said predetermined positions are reproductions of all the components and actuators reproducing the habitability, accessibility and reachability of said physical supports.

8. Digital medium according to claim 7, wherein said display and control device comprises at least one 3D virtual or augmented reality visor wearable by one or more users.

9. A method for use of a 3D virtual or augmented reality visor wearable by a user, wherein a screen is connected to a CPU, the method comprising:

actuating one or more actuators by the CPU so as to adjust the positioning of the physical supports in predetermined positions, said predetermined positions being set by means of said display and control device, or displaying by the CPU, through said display and control device, a position of said physical supports, the position being set by actuating said actuators, wherein said predetermined positions are reproductions, by means of movement routines of all said components and actuators, of new or existing vehicles, for example reproducing the habitability, accessibility and reachability of said physical supports.

* * * * *